(12) United States Patent
Kavalathara et al.

(10) Patent No.: US 9,363,673 B2
(45) Date of Patent: Jun. 7, 2016

(54) SUBSCRIBER IDENTITY MODULE CONTROL IN A PORTABLE COMMUNICATION DEVICE

(71) Applicant: GOOGLE TECHNOLOGY HOLDINGS LLC, Mountain View, CA (US)

(72) Inventors: Shuaib Puzhakkal Kavalathara, Tirur (IN); Abhinay Pothuganti, Kurnool (IN); Akshatha Rajappa Gowda, Mysore (IN)

(73) Assignee: Google Technology Holdings LLC, Mountain View, CA (US)

( * ) Notice: Subject to any disclaimer, the term of this patent is extended or adjusted under 35 U.S.C. 154(b) by 106 days.

(21) Appl. No.: 14/450,353

(22) Filed: Aug. 4, 2014

(65) Prior Publication Data

US 2016/0037339 A1     Feb. 4, 2016

(51) Int. Cl.
*H04M 3/16*      (2006.01)
*H04W 12/06*     (2009.01)
*H04L 29/06*     (2006.01)

(52) U.S. Cl.
CPC ........... *H04W 12/06* (2013.01); *H04L 63/0853* (2013.01)

(58) Field of Classification Search
USPC ........................................................ 455/411
See application file for complete search history.

(56) References Cited

U.S. PATENT DOCUMENTS

| | | | |
|---|---|---|---|
| 5,558,339 A | 9/1996 | Perlman | |
| 5,586,257 A | 12/1996 | Perlman | |
| 6,138,147 A | 10/2000 | Weaver et al. | |
| 6,788,938 B1 | 9/2004 | Sugaya et al. | |
| 7,039,698 B2 | 5/2006 | Slemmer et al. | |
| 7,117,264 B2 | 10/2006 | Becker et al. | |
| 7,174,159 B2 | 2/2007 | Guirauton et al. | |
| 7,266,715 B1 | 9/2007 | Bazzinotti et al. | |
| 7,447,503 B2 | 11/2008 | Shvodian | |
| 7,681,203 B2 | 3/2010 | Mandato et al. | |
| 7,980,876 B2 | 7/2011 | Bombale et al. | |
| 8,036,690 B1 | 10/2011 | Delker et al. | |
| 8,155,664 B2 | 4/2012 | McFarland | |
| 8,224,894 B1 | 7/2012 | Parks et al. | |
| 8,620,293 B2 | 12/2013 | Krinsky | |
| 8,769,131 B2 | 7/2014 | Pomerantz et al. | |
| 9,185,742 B2 | 11/2015 | Das | |
| 2003/0233660 A1 | 12/2003 | Slemmer et al. | |
| 2004/0023722 A1 | 2/2004 | Vuong et al. | |
| 2004/0203378 A1 | 10/2004 | Powers | |
| 2005/0180385 A1 | 8/2005 | Jeong et al. | |

(Continued)

OTHER PUBLICATIONS

"International Search Report and Written Opinion", Application No. PCT/US2015/041537, Oct. 14, 2015, 11 pages.

(Continued)

*Primary Examiner* — Joel Ajayi
(74) *Attorney, Agent, or Firm* — Wolfe-SBMC

(57) ABSTRACT

A communication device includes a communication circuit, one or more processors operable with the communication circuit, one or more memory devices, operable with the one or more processors, a user interface, operable with the one or more processors, and a receiver to receive a subscriber identification module to enable at least some communication by the communication circuit. A locking mechanism, operable with the receiver and responsive to the one or more processors, can selectively physically retain the subscriber identity module within the receiver.

20 Claims, 10 Drawing Sheets

(56) References Cited

U.S. PATENT DOCUMENTS

| | | |
|---|---|---|
| 2006/0026171 A1 | 2/2006 | Savage |
| 2007/0091920 A1 | 4/2007 | Harris et al. |
| 2007/0105496 A1 | 5/2007 | Bonta et al. |
| 2007/0136488 A1 | 6/2007 | Cho et al. |
| 2007/0271317 A1 | 11/2007 | Carmel |
| 2008/0273519 A1 | 11/2008 | Sedeffow |
| 2008/0310371 A1 | 12/2008 | Russell |
| 2009/0145184 A1 | 6/2009 | Cheaz |
| 2009/0164823 A1 | 6/2009 | Aaltonen et al. |
| 2009/0259711 A1 | 10/2009 | Drieu et al. |
| 2010/0022231 A1 | 1/2010 | Heins et al. |
| 2010/0057563 A1 | 3/2010 | Rauber et al. |
| 2010/0057924 A1 | 3/2010 | Rauber et al. |
| 2010/0074261 A1 | 3/2010 | Muhamed |
| 2010/0158225 A1 | 6/2010 | Rogers |
| 2010/0269152 A1 | 10/2010 | Pahlavan et al. |
| 2011/0093605 A1 | 4/2011 | Choudhury et al. |
| 2011/0106755 A1 | 5/2011 | Hao et al. |
| 2011/0268425 A1 | 11/2011 | Glen |
| 2012/0011511 A1 | 1/2012 | Horvitz et al. |
| 2012/0124194 A1 | 5/2012 | Shouraboura |
| 2012/0198508 A1 | 8/2012 | Kuo |
| 2012/0244839 A1 | 9/2012 | Shen |
| 2012/0260120 A1 | 10/2012 | Mongeau et al. |
| 2013/0170451 A1 | 7/2013 | Krause et al. |
| 2013/0182712 A1 | 7/2013 | Aguayo et al. |
| 2013/0282869 A1 | 10/2013 | Mate et al. |
| 2013/0343281 A1 | 12/2013 | Bakker et al. |
| 2014/0010282 A1 | 1/2014 | He et al. |
| 2014/0032718 A1 | 1/2014 | Berger et al. |
| 2014/0033058 A1 | 1/2014 | Perotti |
| 2014/0066069 A1 | 3/2014 | Salami et al. |
| 2014/0122683 A1 | 5/2014 | Zhao et al. |
| 2014/0171064 A1 | 6/2014 | Das |
| 2014/0173036 A1 | 6/2014 | Das |
| 2016/0029279 A1 | 1/2016 | Bellamkonda et al. |

OTHER PUBLICATIONS

"Non-Final Office Action", U.S. Appl. No. 13/713,041, Dec. 4, 2014, 12 Pages.

"Notice of Allowance", U.S. Appl. No. 13/713,041, Mar. 17, 2015, 5 pages.

"Notice of Allowance", U.S. Appl. No. 13/713,041, Jul. 6, 2015, 8 pages.

Vorvaja,"Performance of Overlay Bluetooth—WiFi Networks with QoS-oriented Vertical Handover", IEEE Transactions on Mobile Computing, Dec. 1, 2006, 5 pages.

SUBSCRIBER IDENTITY MODULE CONTROL IN A PORTABLE COMMUNICATION DEVICE

BACKGROUND

1. Technical Field

This invention relates generally to electronic devices, and more particularly to electronic communication devices.

2. Background Art

The use of portable electronic devices, be they smartphones, gaming devices, or multimedia devices, is becoming a ubiquitous part of life. Users of such devices rely upon them not only for communication, but also to maintain to-do lists, surf the Internet, maintain personal and business calendars, view videos, listen to audio recordings, and to stay up-to-date with friends, family, and co-workers. Such devices are used so readily, in large part, due to their portability.

Problems can arise when these devices are lost or stolen. While there are sophisticated tracking systems with which a person who misplaced a device or victim of crime can track the device, each of these tracking systems relies upon a lost device being able to identify itself to a network. Unscrupulous people who find or have stolen a device adapting with the advancement of tracking systems, and are discovering new ways to prevent the device from properly identifying themselves. It would be advantageous to have an improved device.

Figure 1:
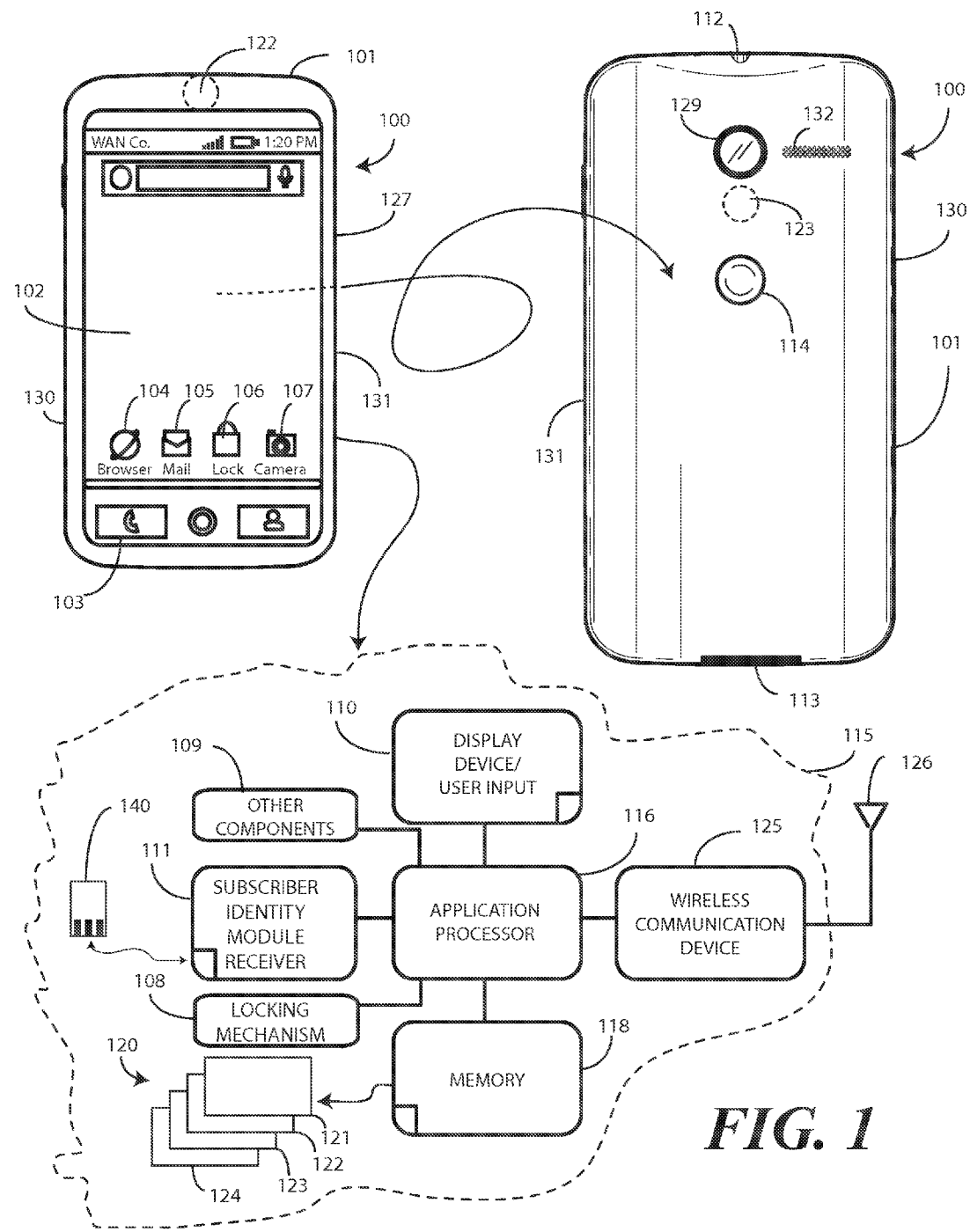
FIG. 1 illustrates one explanatory portable communication device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to integrating software and hardware systems to provide a secure locking mechanism for a subscriber identification module. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of integrating software and hardware locking mechanisms for subscriber identification modules or other portable electronic device credentialing devices as described herein. The non-processor circuits may include, but are not limited to, a radio receiver, a radio transmitter, signal drivers, clock circuits, power source circuits, and user input devices. As such, these functions may be interpreted as steps of a method to perform retention, locking, and selective ejection of subscriber identification modules or other similar device credentialing devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that portable communication devices frequently employ credentialing devices for communication with a network. Illustrating by example, in the development of mobile telephone communication, a succession of standards has been used to control how communication is facilitated. One of the more common standards used today is Global System for Mobile Communications (GSM). GSM devices are used by millions of people across more than 200 countries and territories.

One of the key features of GSM systems is the use of a credentialing device to execute communication with the network. GSM systems are not the only systems using a credentialing devices. For instance, Code Duplexed Multiple Access (CDMA) systems use them as well, as do other systems. In a GSM system, the credentialing device is known as a Subscriber Identity Module (SIM). In a CDMA system, the credentialing device is known as a CDMA Subscriber Identification Module (CSIM). Each is commonly employed through a physical card, known as a SIM card, CSIM card, or other name.

Using the GSM system for explanatory purposes, the SIM card is a detachable "smart" card that can be inserted and removed from a portable communication device. Once inserted into the device, the SIM card contains the user's subscription information and information related to network security. Specifically, in relation to security, the SIM card contains a unique set of security keys that enables a subscriber in possession of the SIM card to communicate with their subscribed communication provider.

Networks use this information to identify a particular device. Thus, in the use of tracking systems that track lost or stolen devices in a GSM, CDMA, or other similar system, the tracking system is only effective if the subscriber identity module is in the mobile communication device and the mobile communication device is actively in communication with the network. There is currently no effective mechanism by which a mobile device can be tracked when it is powered OFF, in a mode where no network communication occurs, such as when in an "airplane" mode, or where the subscriber identification module has been removed from the device. Thieves and other unscrupulous actors take advantage of this fact by simply switching out SIM cards after stealing a device. Prior art SIM receivers are manual devices. It is easy to remove a SIM card with a bent paperclip in most devices.

Embodiments of the present disclosure serve as a crime buster in that they provide software and hardware integration to provide a locking mechanism for a credentialing device that prevents a thief from removing the credentialing device after stealing the mobile communication device. In one embodiment, whenever a SIM card or other similar credentialing device is inserted into, or removed from, a mobile communication device, a credentialing device application requires a user to enter an identification sequence at a user interface. Without the proper entry of the identification sequence, removal of the credentialing device is not permitted. Examples of identification sequences include Personal Identification Numbers (PINs), passwords, and so forth. Using a SIM card as an example, prior to removal of the SIM card, a SIM application in a mobile communication device will prompt a user for a PIN or password which will authorize hardware devices, such as SIM tray drivers or other drive mechanics, to initiate SIM card ejection process. Accordingly, when a thief does not know the identification sequence, they are unable to switch the SIM card.

In one embodiment, a communication device includes one or more processors operable with a communication circuit. The communication device can also include one or more memory devices, which are operable with the one or more processors.

A user interface can be disposed along the communication device for receiving user input. User interfaces can include keypads, touch surfaces, touch sensitive displays, and so forth. The user interface can be operable with the one or more processors.

The communication device can include receiver to receive a subscriber identity module. As noted above, in many embodiments the subscriber identification module is used to enable at least some communication by the communication circuit. Examples of the communication include voice communication, such as making telephone calls, or data communication, such as sending and receiving text or multimedia messages, surfing the Web, and so forth.

In one embodiment, the communication device includes a locking mechanism. Examples of suitable locking mechanisms include lockable motors to selectively eject the subscriber identification module from the receiver, a lockable door to selectively close the receiver, or a gating device to selectively prevent translation of the subscriber identification module out of the receiver. Other locking mechanisms will be obvious to those of ordinary skill in the art having the benefit of this disclosure.

In one embodiment, the locking mechanism is operable with the receiver and responsive to the one or more processors. Accordingly, the one or more processors can cause the locking mechanism to selectively physically retain the subscriber identity module within the receiver. More specifically, in one embodiment the one or more processors can detect insertion of the subscriber identity module into the receiver, request definition of an identification sequence at the user interface, receive the identification sequence from the user interface, and cause the locking mechanism to physically retain the subscriber identity module within the receiver. However, where the identification sequence is not received, the one or more processors can cause the locking mechanism to continue to physically retain the subscriber identity module in the receiver.

Turning now to FIG. 1, illustrated therein is one explanatory communication device 100 configured in accordance with one or more embodiments of the disclosure. The communication device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the communication device 100 could equally be a palm-top computer, a tablet computer, a gaming device, a media player, or other device that interacts with a network through data communication.

This illustrative communication device 100 includes a display 102, which may optionally be touch-sensitive. In one embodiment where the display 102 is touch-sensitive, the display 102 can serve as a primary user interface of the communication device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory communication device 100 of FIG. 1 includes a housing 101. In one embodiment, the housing 101 includes two housing members. A front housing member 127 is disposed about the periphery of the display 102. Said differently, the display 102 is disposed along a front major face of the front housing member 127 in one embodiment. A rear-housing member 128 forms the backside of the communication device 100 in this illustrative embodiment and defines a rear major face of the electronic device. Features can be incorporated into the housing members 127,128. Examples of such features include an imager, shown as camera 129, or an optional speaker port 132. Each is shown disposed on the rear major face of the communication device 100 in this embodiment, but could also be disposed along the front major face. Additionally, imagers could be disposed on multiple faces, such as the front major face, rear major face, or any of the side faces. In this illustrative embodiment, a user interface component 114, which may be a button or touch sensitive surface, can also be disposed along the rear-housing member 128.

In one embodiment, the communication device 100 includes one or more connectors 112,113, which can include an analog connector, a digital connector, or combinations thereof. In this illustrative embodiment, connector 112 is an analog connector disposed on a first edge, i.e., the top edge, of the communication device 100, while connector 113 is a digital connector disposed on a second edge opposite the first edge, which is the bottom edge in this embodiment.

A block diagram schematic 115 of the communication device 100 is also shown in FIG. 1. In one embodiment, the communication device 100 includes one or more processors 116. In one embodiment, the one or more processors 116 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more Application Specific Integrated Circuits (ASICs), programmable logic, or other type of processing device. The application processor and the auxiliary processor(s) can be operable with the various components of the communication device 100. Each of the application processor and the auxiliary processor(s) can be configured to process and execute executable software code to perform the various functions of the communication device 100. A storage device, such as memory 118, can optionally store the executable software code used by the one or more processors 116 during operation.

In this illustrative embodiment, the communication device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 125 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the communication device 100. For example, in one embodiment the one or more processors 116 comprise one or more circuits operable to present presentation information, such as images, text, and video, on the display 102. The executable software code used by the one or more processors 116 can be configured as one or more modules 120 that are operable with the one or more processors 116. Such modules 120 can store instructions, control algorithms, and so forth.

In one embodiment, the one or more processors 116 are responsible for running the operating system environment 121. The operating system environment 121 can include a kernel, one or more drivers, and an application service layer 123, and an application layer 124. The operating system environment 121 can be configured as executable code operating on one or more processors or control circuits of the communication device 100.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the communication device 100, an electronic mail application 105 configured to send and receive electronic mail, a subscriber identification module locking mechanism application 106 configured to permit the user to selectively retrieve a subscriber identification module 140 from a receiver 111 of communication device 100, and a camera application 107 configured to capture still (and optionally video) images. These applications are illustrative only, as others will be obvious to one of ordinary skill in the art having the benefit of this disclosure. Additionally, others will be described in more detail below.

In one or more embodiments, the one or more processors 116 are responsible for managing the applications and all secure information of the communication device 100. The one or more processors 116 can also be responsible for launching, monitoring and killing the various applications and the various application service modules. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth. In one embodiment, as will be described in more detail below, the one or more processors 116 may generate commands to control a locking mechanism 108 to either release the subscriber identification module 140 from the receiver 111, or alternatively to physically retain the subscriber identification module 140 within the receiver 111, based upon whether an appropriate identification sequence has been received from the user interface, e.g., touch-sensitive display 102.

The one or more processors 116 can also be operable with other components 109. The other components 109, in one embodiment, include an acoustic detector, such as a microphone. The one or more processors 116 may process information from the other components 109 alone or in combination with other data, such as the information stored in the memory 118 or information received from the user interface.

Other user input devices 110 may include a video input component such as an optical sensor, another audio input component such as a microphone, and a mechanical input component such as button or key selection sensors, touch pad sensor, touch screen sensor, capacitive sensor, motion sensor, and switch. Similarly, the other components 109 can be included, such as video, audio, and/or mechanical outputs. For example, the output components may include a video output component such as the display 102 or auxiliary devices including a cathode ray tube, liquid crystal display, plasma display, incandescent light, fluorescent light, front or rear projection display, and light emitting diode indicator. Other examples of output components include audio output components such as speaker port 132 or other alarms and/or buzzers and/or a mechanical output component such as vibrating or motion-based mechanisms.

The other components 109 may include, but are not limited to, accelerometers, touch sensors, surface/housing capacitive sensors, audio sensors, and video sensors. Touch sensors may used to indicate whether the device is being touched at side edges 130,131. The other components 109 of the electronic device can also include a device interface to provide a direct connection to auxiliary components or accessories for additional or enhanced functionality and a power source, such as a portable battery, for providing power to the other internal components and allow portability of the communication device 100.

It is to be understood that FIG. 1 is provided for illustrative purposes only and for illustrating components of one communication device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

The subscriber identification module 140, in one embodiment, facilitates communication between the communication device 100 and a network. Using a GSM system as an illustrative example, once the subscriber identification module 140 is inserted into the receiver 111, and the communication device 100 has been powered ON, the one or more processors 116 read information from the subscriber identification module 140. The one or more processors 116 then cause the communication circuit 125 to transmit a unique International Mobile Subscriber Identity (IMSI) across a network to a service provider requesting access to the network and authentication from the service provider. The service provider then searches its database for the incoming IMSI and its associated security key. If the IMSI and security key are found, the service provider then allows the communication device 100 to access the service provider's network and begin communicating.

In one embodiment, each subscriber identification module 140 contains a unique IMSI that is registered with a service provider. Each IMSI is associated with a single user and a single mobile device. This singular association between a subscriber identification module 140 and a particular communication device 100 allows the device to be tracked when lost or stolen, as the service provider knows the identity of each device via the IMSI. However, if the subscriber identification module 140 is removed without authorization, this ability is lost.

Embodiments of the present disclosure prevent this by providing a locking mechanism 108 that is operable with the receiver 111. As noted above, the receiver 111 is to receive the subscriber identification module 140, which enables at least some communication by the communication circuit 125 when the IMSI is registered with a service provider. The locking mechanism 108 is operable with the receiver 111, and is responsive to the one or more processors 116, to selectively physically retain the subscriber identification module 140 within the receiver 111.

For example, in one embodiment the receiver 111 comprises a motor that receives insertion of the subscriber identification module 140 and then mechanically retracts the subscriber identification module 140 into the housing 101 of the communication device 100. In one embodiment, the locking mechanism 108 comprises a lockable motor to selectively eject the subscriber identification module 140 from the receiver 111. When the locking mechanism 108 is locked, the motor is inoperable to eject the subscriber identification module 140 from the receiver 111. However, when the locking mechanism 108 is unlocked, the motor can eject the subscriber identification module 140 from the receiver 111.

In another embodiment, the receiver 111 comprises a slot in the housing 101 of the communication device 100 into which a user inserts the subscriber identification module 140. In such an embodiment, the locking mechanism 108 may be a lockable door to selectively close the receiver 111. When the door is opened, i.e., when the locking mechanism 108 is unlocked, the user can remove the subscriber identification module 140 from the receiver 111. However, when the locking mechanism 108 is locked and the door is closed, the user is unable to remove the subscriber identification module 140 from the communication device 100.

In yet another embodiment, receiver 111 can comprise a device to—either manually or automatically—translate the subscriber identification module 140 into the communication device 100. Accordingly, in another embodiment, the locking mechanism 108 can be a lockable gating device to selectively prevent translation of the subscriber identification module 140 out of the receiver 111. Other types of locking mechanisms will be obvious to those of ordinary skill in the art having the benefit of this disclosure.

In one or more embodiments, the one or more processors 116 are to lock the locking mechanism 108 upon insertion of the subscriber identification module 140. The one or more processors 116 can then be configured to detect one or more of the following conditions: attempted removal of the subscriber identification module 140, an attempt to power OFF the communication device 100, or an attempt to remove the communication device 100 from communication with a network, e.g., place the communication device 100 in an airplane mode. When this occurs, the one or more processors 116 can request, at the user interface, an identification sequence such as a PIN or password. If the proper identification sequence is received, the one or more processors 116 can cause the locking mechanism 108 to physically release the subscriber identification module 140 for removal from the receiver 111. By contrast, where the identification sequence is not received, the one or more processors 116 can cause the locking mechanism 108 to continue to physically retain the subscriber identification module 140 within the receiver 111. This will be illustrated in the following figures.

Figure 2:
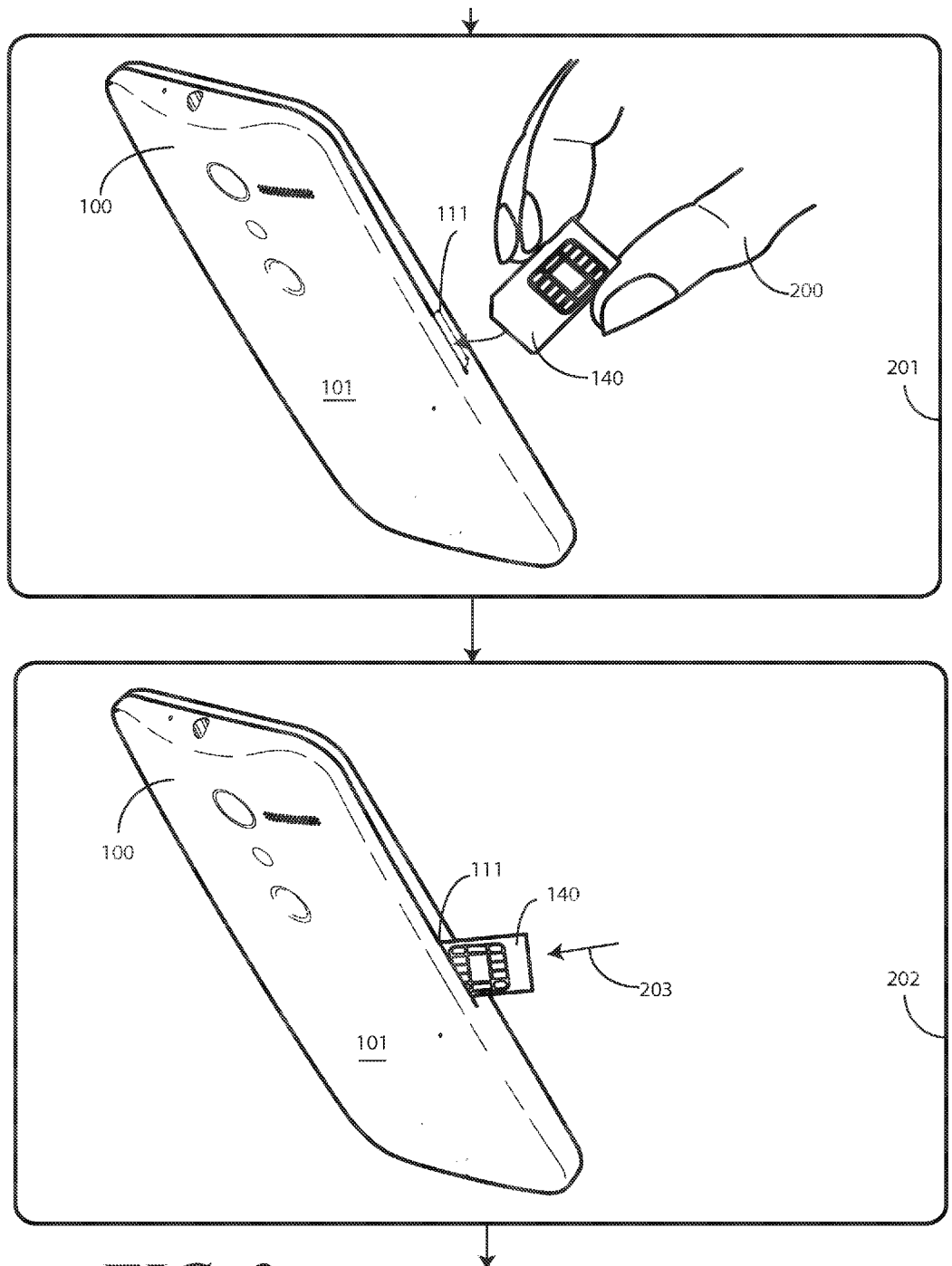
FIG. 2 illustrates steps of an explanatory method in accordance with one or more embodiments of the disclosure.

Beginning with FIG. 2, at step 201 a user 200 is inserting a subscriber identification module 140 into a receiver 111 of a communication device 100. In one embodiment, the receiver 111 comprises a mechanism to translate the subscriber identification module 140 into the housing 101 of the communication device 100. As shown at step 202, the subscriber identification module 140 is being translated 203 into the housing 101 of the communication device 100 by the receiver 111 and it's associated hardware. One or more processors (116) of the communication device 100 can detect this insertion of the subscriber identification module 140 into the receiver 111.

Figure 3:
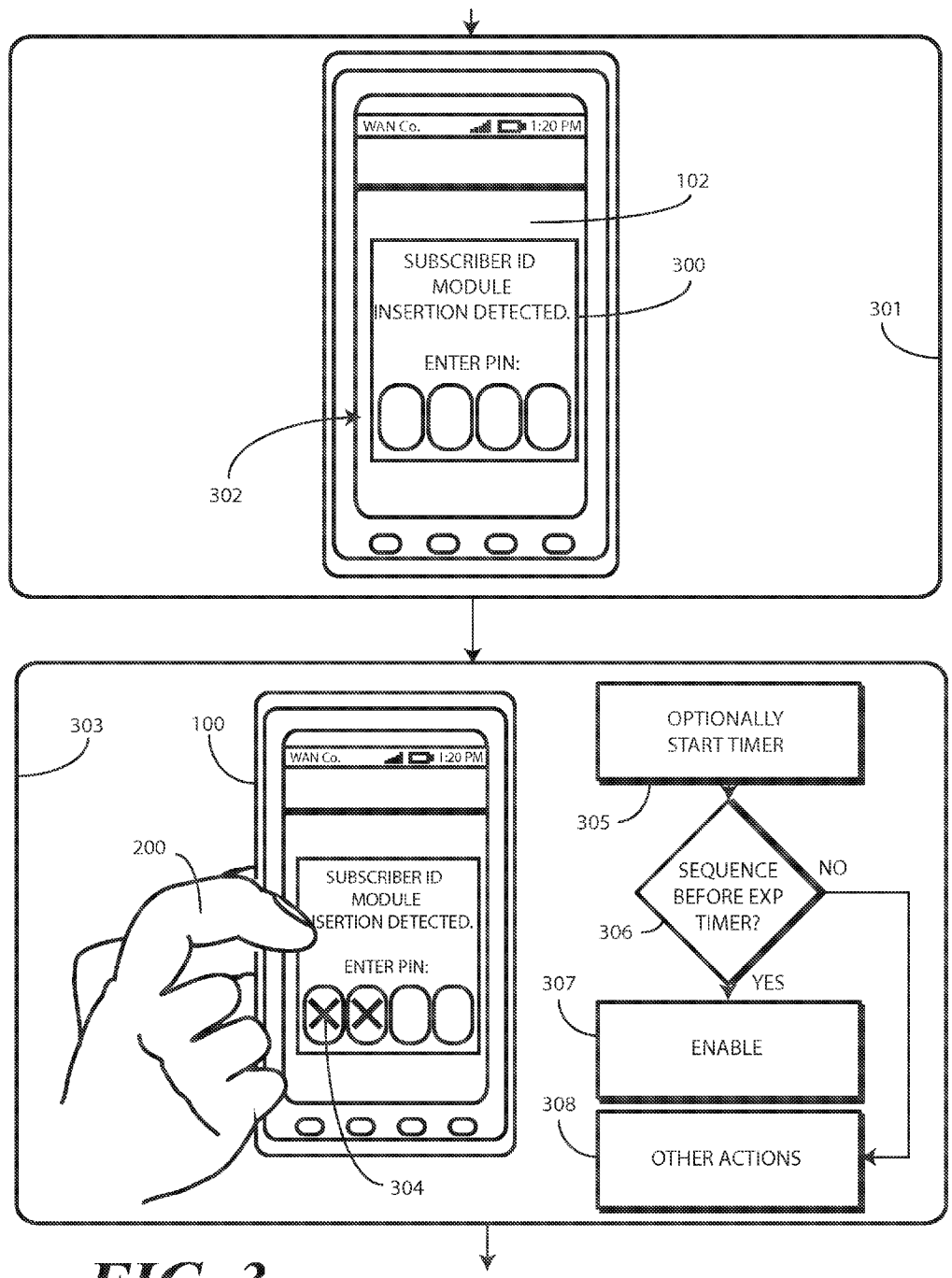
FIG. 3 illustrates steps of an explanatory method in accordance with one or more embodiments of the disclosure.
Figure 4:
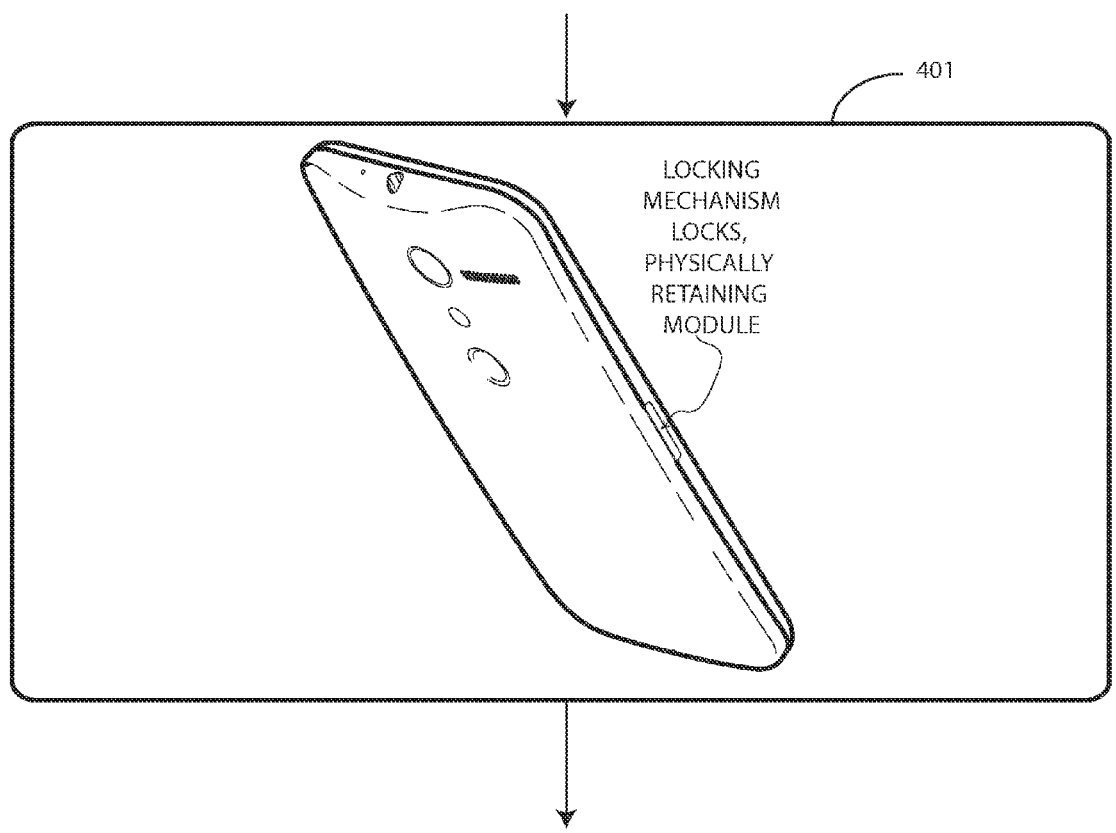
FIG. 4 illustrates another step of an explanatory method in accordance with one or more embodiments of the disclosure.

Turning to FIG. 3, at step 301, the one or more processors (116) can request the definition of an identification sequence 302 at a user interface of the communication device 100, which is the display 102 in this illustrative example. Here, the one or more processors (116) have presented a prompt 300 on the display 102 that states, "Subscriber ID Module Detected:

Enter PIN." At this point, as shown at step 303, the user 200 may define a PIN 304 or other suitable identification sequence 302. The one or more processors (116) can receive the PIN 304 or other suitable identification sequence 302, and upon receiving this definition, cause the locking mechanism (108) to physically retain the subscriber identification module (140) within the receiver (111) as shown at step 401 of FIG. 4.

Returning to FIG. 3, in one optional embodiment, the one or more processors (116) can start a timer at step 305 upon detecting insertion of the subscriber identification module (140) into the receiver (111). Where the one or more processors (116) receive the PIN 304 or other suitable identification sequence 302 prior to the expiration of the timer, as shown at decision 306, they can not only cause the locking mechanism (108) to physically retain the subscriber identification module (140) within the receiver (111), but also enable communications between the communication device 100 and a network at step 307. Where the PIN 304 or other suitable identification sequence 302, and upon receiving this definition is not received prior to expiration of the timer, the one or more processors (116) can take other actions at step 308. One example of an other action would be to automatically power OFF the device. Another other action would be to preclude at least some communication with the network by the communication circuit (125). Illustrating by example, emergency or "911" communication may be allowed as required by law, while all other communication may be precluded at step 308. In one embodiment, the one or more processors (116) may preclude the at least some communication by the communication circuit (125) until the PIN 304 or other suitable identification sequence 302 is received.

Figure 5:
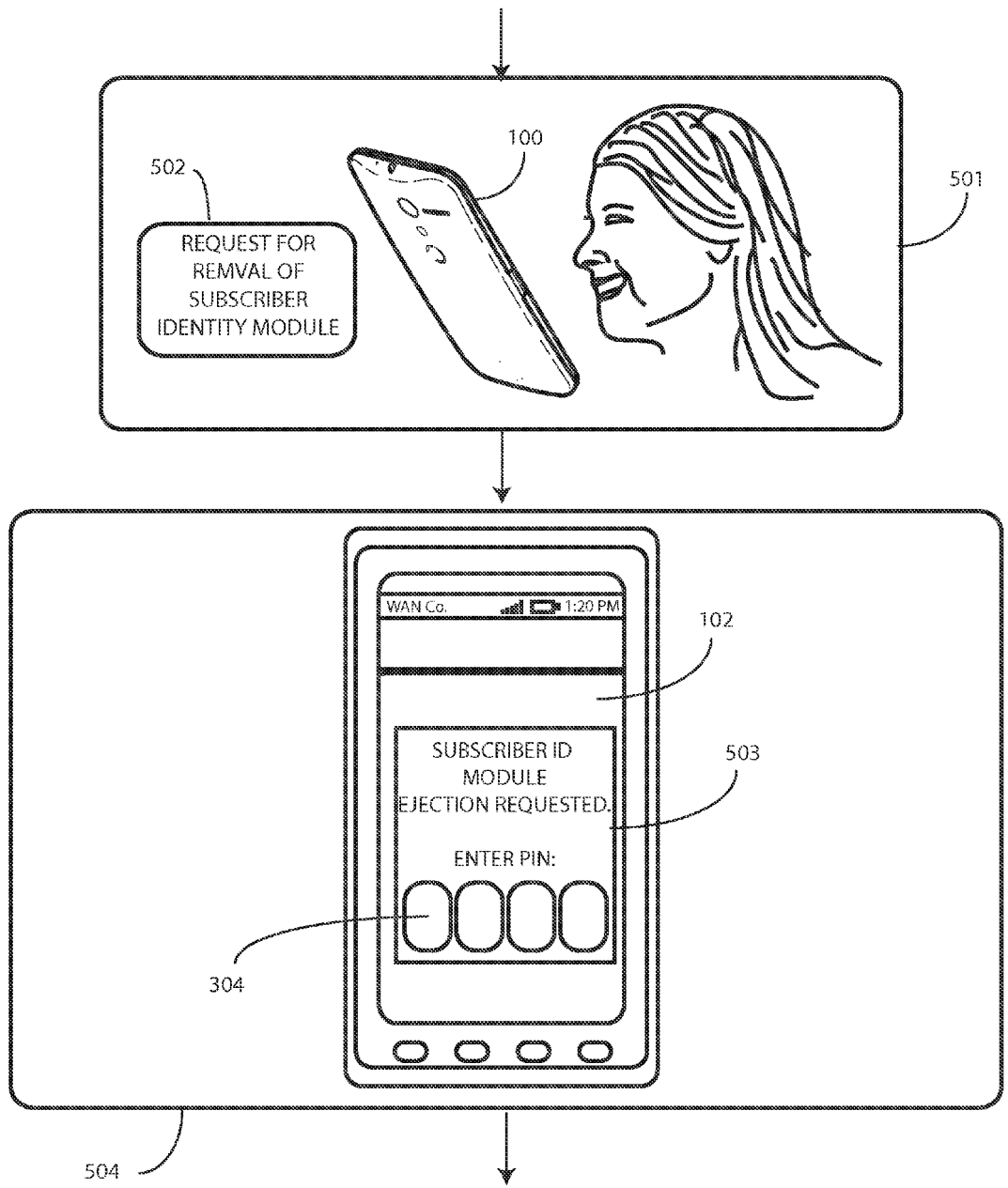
FIG. 5 illustrates steps of an explanatory method in accordance with one or more embodiments of the disclosure.

Turning now to FIG. 5, at step 501, the one or more processors (116) receive a request 502 for ejection of the subscriber identification module (140) from the communication device 100. Where this occurs, in one embodiment, the one or more processors (116) can request, at the user interface, the PIN 304 or other suitable identification sequence (302). Here, the one or more processors (116) have presented a prompt 503 on the display 102 at step 504 stating, "Subscriber ID Module Ejection Requested: Enter PIN."

Figure 6:
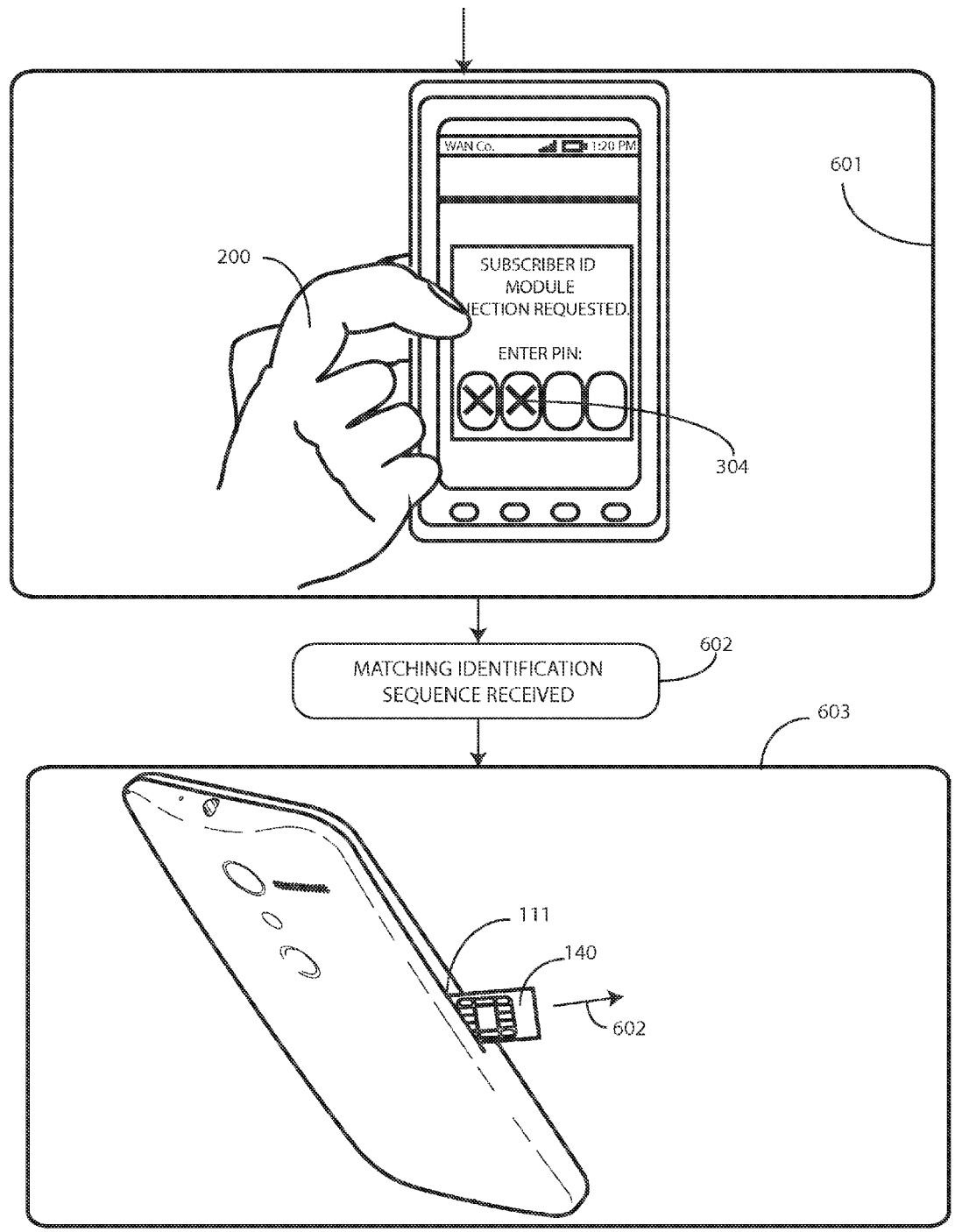
FIG. 6 illustrates steps of an explanatory method in accordance with one or more embodiments of the disclosure.

At this point, as shown at step 601 of FIG. 6, the user 200 may enter a PIN 304 or other suitable identification sequence (302). The one or more processors (116) can receive the PIN 304 or other suitable identification sequence (302) and can determine whether it matches the one defined at step (303) of FIG. 3 at step 602. Where the PIN 304 or other suitable identification sequence (302) is received, the one or more processors (116) can cause the locking mechanism (108) to physically release 602 the subscriber identification module 140 within the receiver 111 as shown at step 603.

Figure 7:
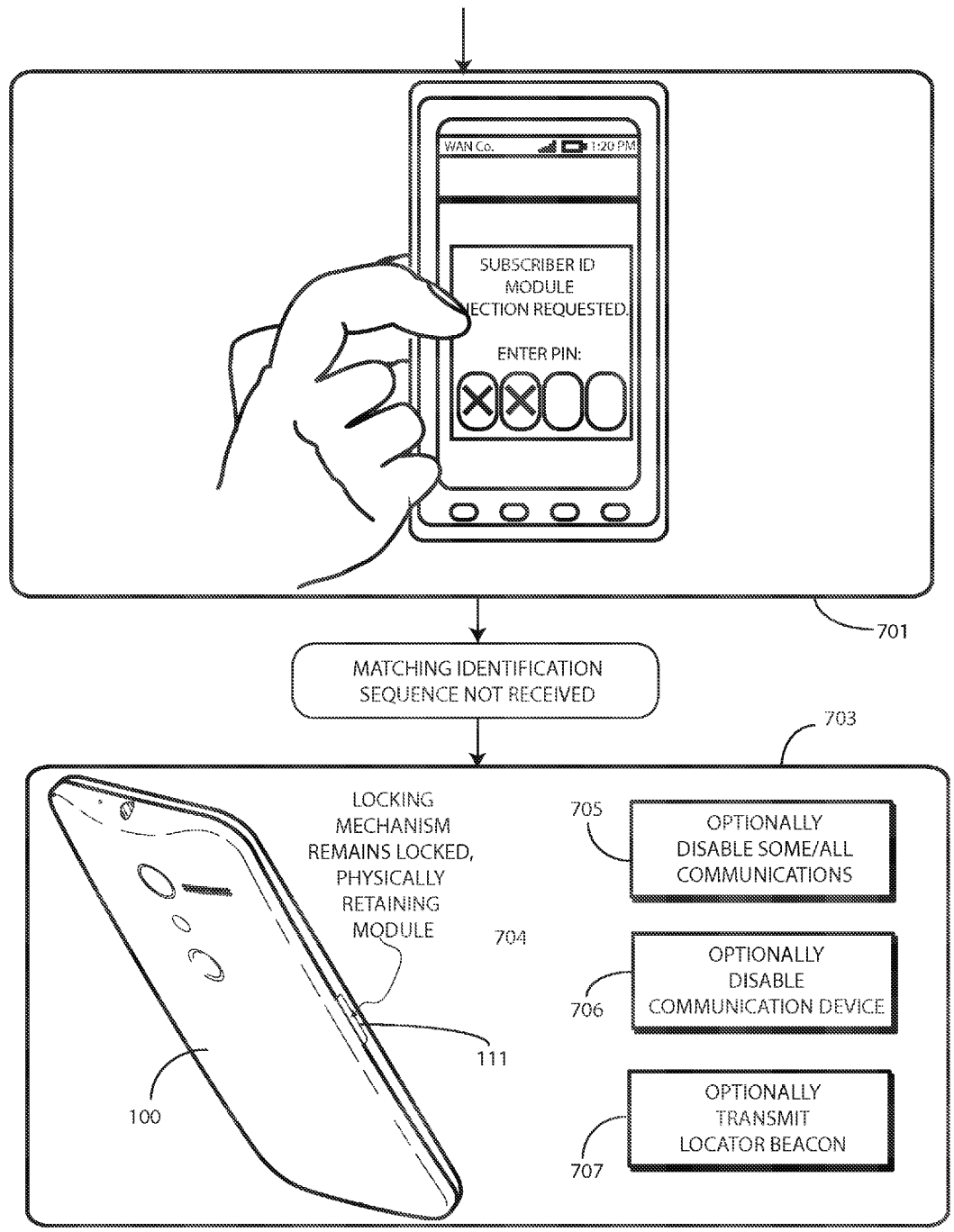
FIG. 7 illustrates steps of an explanatory method in accordance with one or more embodiments of the disclosure.

Turning to FIG. 7, the user 200 mis-enters the PIN 304 or other suitable identification sequence (302) at step 701. This may occur, for example, where the user 200 is a miscreant or thief trying to unscrupulously use the communication device 100. This mis-match of the PIN 304 or other suitable identification sequence (302) is detected at step 702. Where this occurs, several actions can occur.

In one embodiment, as shown at step 703, where the PIN 304 or other suitable identification sequence (302) is not received, the one or more processors (116) cause the locking mechanism (108) to continue to physically retain 704 the subscriber identification module (140) in the receiver 111. In another embodiment, shown at step 705, the one or more processors (116) can disable some or all communications with a network by the communications circuit (125). In another embodiment, as shown at step 706, the one or more processors (116) can disable the entire communication device 100. In yet another embodiment, the one or more processors (116) can conclude that the mis-entry of the PIN 304 or other suitable identification sequence (302) is due to foul play and, as shown at step 707, can cause the communication circuit (125) to deliver a tracking beacon to a network so that the communication device 100 can be tracked by the authorities or rightful owner. A similar action can occur when the subscriber identification module (140) is removed from the receiver prior 111 to receiving the PIN 304 or other suitable identification sequence (302) in response to the request.

Mis-entry of the PIN 304 or other suitable identification sequence (302) is not the only action that can cause the locking mechanism (108) to spring into action. Embodiments of the disclosure contemplate that other actions could be performed without authorization, or alternatively by people with less than honorable motives. For example, a thief who has stolen a device may wish to turn it OFF or place it in airplane mode to prevent it from communicating with a network. In another example, a thief or miscreant may attempt to remove the subscriber identification module (140) by force when the incorrect PIN 304 or other suitable identification sequence (302) is entered. Accordingly, in one or more embodiments, if one of these actions occurs, the one or more processors (116) can take steps in accordance with the methods if FIGS. 8-11.

Figure 8:
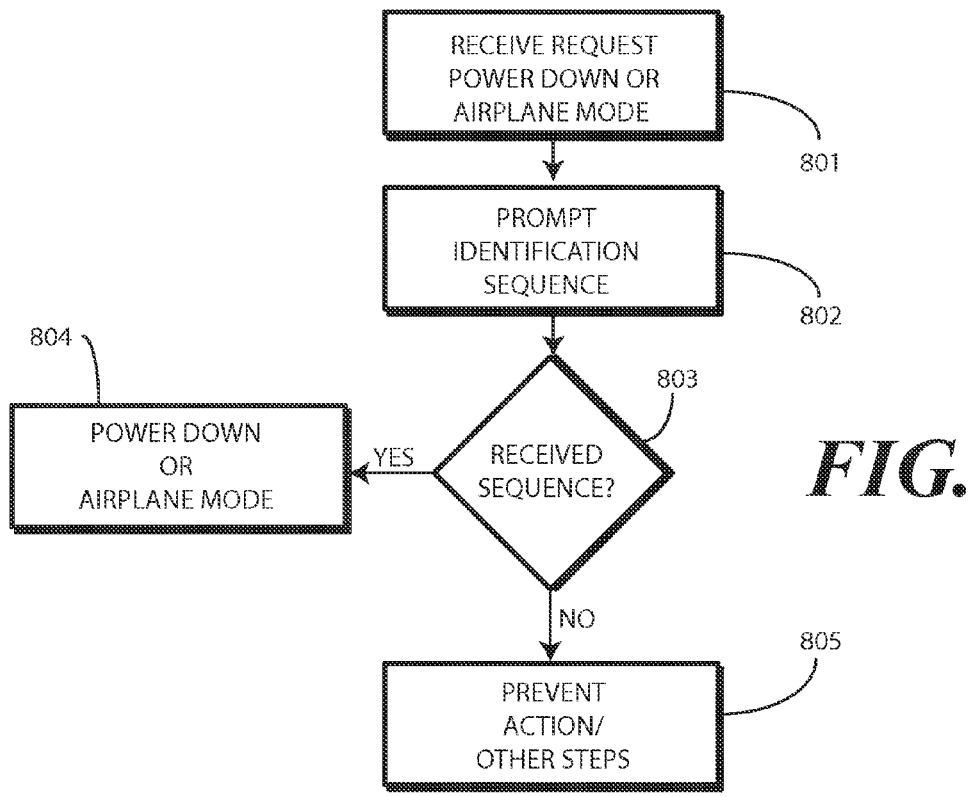
FIG. 8 illustrates an explanatory method in accordance with one or more embodiments of the disclosure.

Beginning with FIG. 8, at step 801 the one or more processors (116) can receive a request to either power OFF the communication device (100), or alternatively to place the communication device (100) in an airplane mode of operation. A request to place the communication device (100) in the airplane mode is equivalent to a request to disable communication by the communication circuit (125). When this occurs, as shown at step 802, the one or more processors (116) can request, at the user interface, the identification sequence. At decision 803, the one or more processors (116) can determine whether the PIN (304) or other suitable identification sequence (302) is received. Where it is, the requested action can be performed at step 804. Where it is not, the one or more processors (116) may take one of several different actions.

In one embodiment, as shown at step 805, where the identification sequence is not received, the one or more processors (116) can prevent powering OFF the communication device (100). In another embodiment, the one or more processors (116) can partially or entirely disable the communication circuit (125). In yet another embodiment, the one or more processors (116) can cause the locking mechanism (108) to physically retain the subscriber identification module (140) within the receiver (111). In another embodiment, the one or more processors (116) can disable user interaction with the communication circuit (125). In still another embodiment, the one or more processors (116) can cause the communication circuit (125) to deliver a tracking beacon to a network. Of course, a combination of one or more of these approaches can be used. Further, other actions will be obvious to those of ordinary skill in the art having the benefit of this disclosure.

Figure 9:
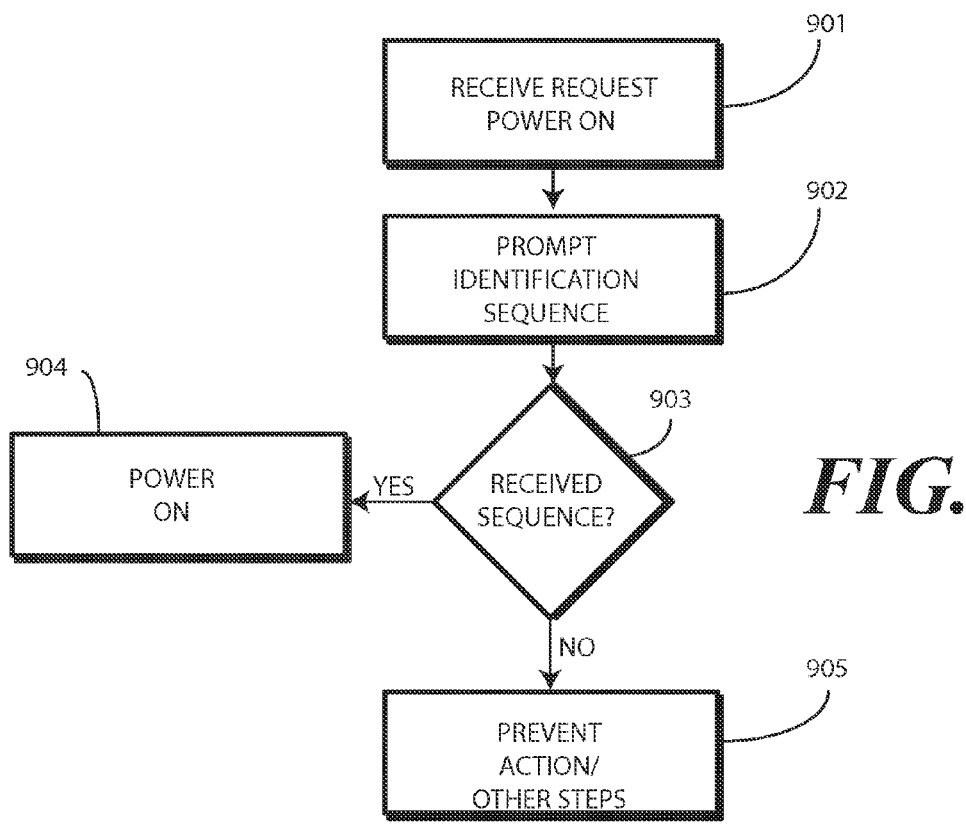
FIG. 9 illustrates another explanatory method in accordance with one or more embodiments of the disclosure.

In FIG. 9, the opposite method is shown. At step 901 the one or more processors (116) can receive a request to power ON the communication device (100). When this occurs, as shown at step 902, the one or more processors (116) can request, at the user interface, the identification sequence. At decision 903, the one or more processors (116) can determine whether the PIN (304) or other suitable identification sequence (302) is received. Where it is, the requested action can be performed at step 904. Where it is not, the one or more processors (116) may take one of several different actions as described in the preceding paragraph at step (805).

Figure 10:
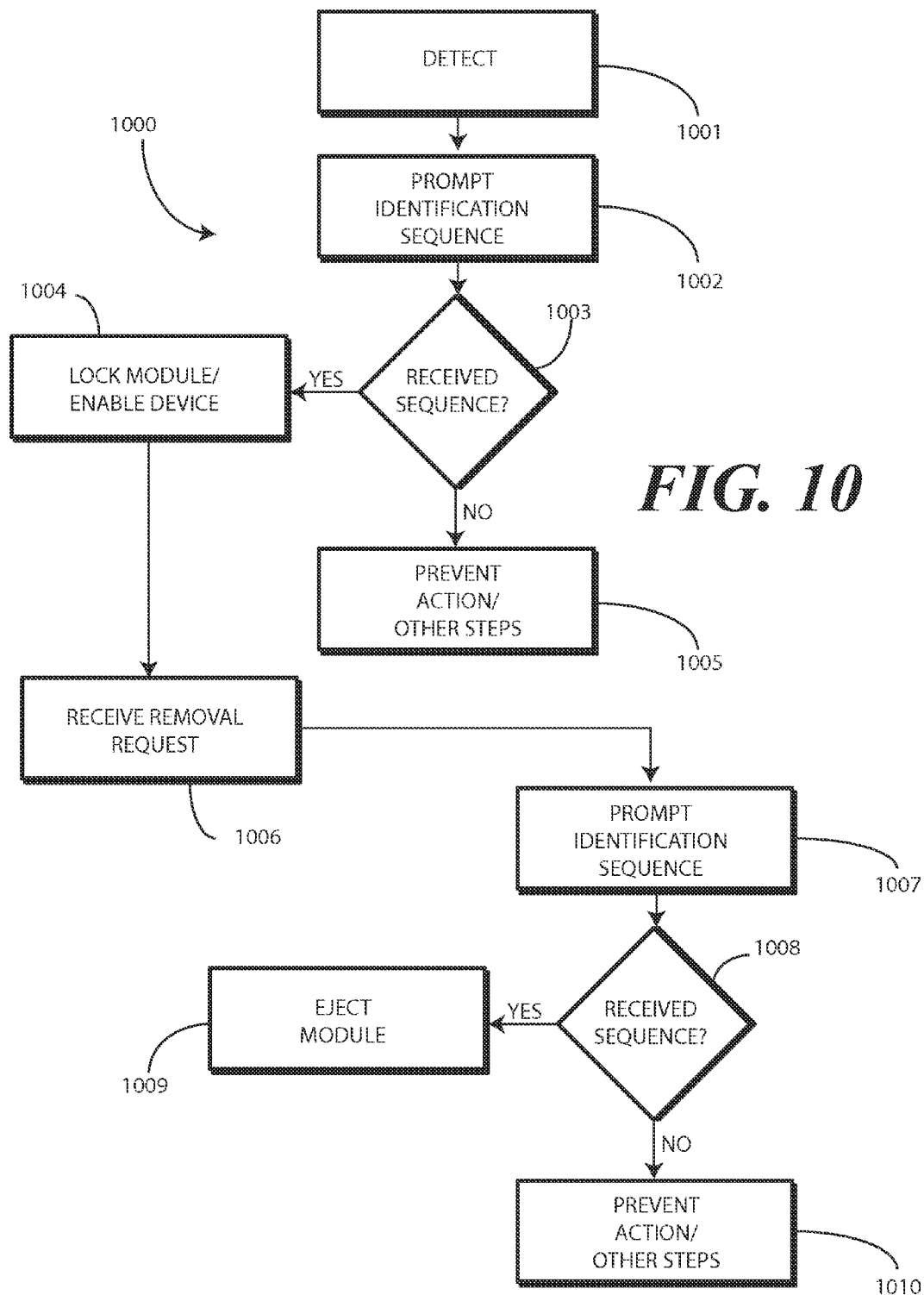
FIG. 10 illustrates yet another explanatory method in accordance with one or more embodiments of the disclosure.

FIG. 10 illustrates a more generalized method 1000. At step 1001, the method detects, with one or more processors, attachment of a subscriber identity module into a receiver of a communication device. At step 1002, the method 1000 requests, at a user interface, entry of an identification sequence. Whether the sequence is received is determined at decision 1003.

Upon receiving the identification sequence, the method 1000 can cause a locking mechanism to physically retain the subscriber identity module within the receiver. Where the identification sequence is not received, the actions of step (805), in any combination, can occur at step 1005.

At a later time, as shown at step 1006, the method 1000 can receive a request for ejection of the subscriber identity module from the receiver. At step 1007, the method 1000 can request, at the user interface, entry of the identification sequence. Receipt of the same is detected at decision 1008. Where the identification sequence is received, the method 1000 can eject the subscriber identity module at step 1009. Where it is not, the method 1000 can preclude removal of the subscriber identity module from the receiver at step 1010. The method 1000 may preform other steps of step (805) at step 1010 as well, including sending a tracking beacon to a network by a communication circuit, and so forth.

Assuming step 1009 was successful, the method 1000 may repeat. Said differently, the method 1000 can detect insertion of another subscriber identity module at the receiver, request definition of another identification sequence at the user interface, receive the another identification sequence from the user interface, and again cause the locking mechanism to physically retain the subscriber identity module within the receiver.

Figure 11:
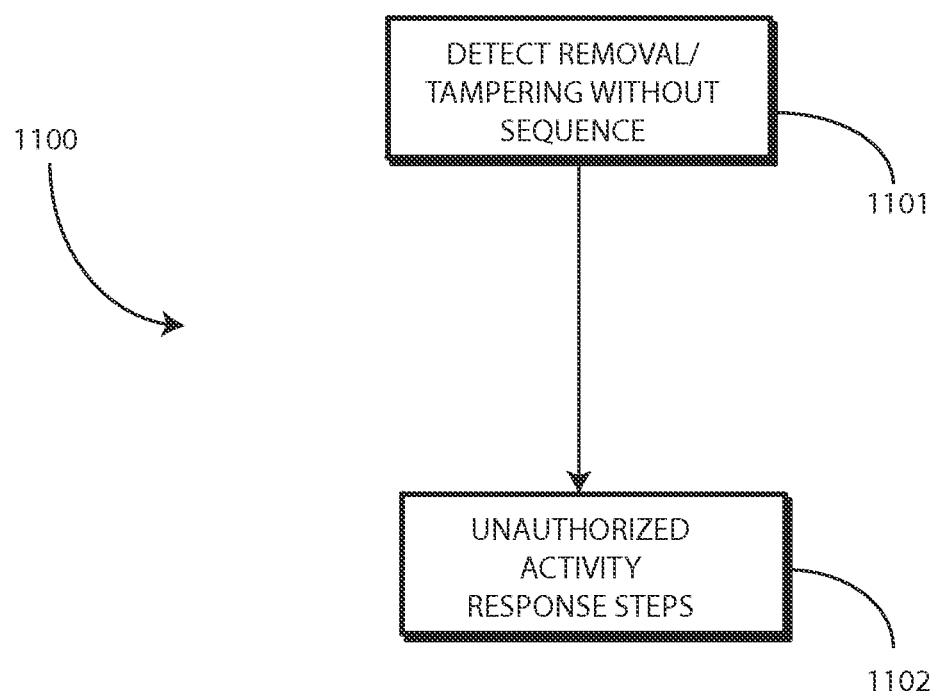
FIG. 11 illustrates another explanatory method in accordance with one or more embodiments of the disclosure.

At FIG. 11, a method 1100 of detecting tampering is provided. In accordance with this method 1100, one or more processors of a communication device can disable user interaction with the communication circuit when the subscriber identification module is removed from the receiver prior to receiving the identification sequence in response to a request for the same.

Illustrating by example, at step 1101, the method 1100 can detect forced removal of a subscriber identity module without entry of a requested identification sequence. Where this occurs, at step 1102, the method 1100 can disable user interaction with one or more of the communication device or a communication circuit of the communication device. This serves to not allow a thief to later insert a new subscriber identity module and continue to use the communication device.

Embodiments of the disclosure provide numerous advantages over prior art designs. For example, with an electronic communication device configured in accordance with embodiments described above, a user of the device by preventing misuse of the device when it is lost or stolen. Using the locking mechanism and integrated software described above, the communication device can always be tracked, as the subscriber identification module will remain in the device until an identification sequence is received. Additionally, the device cannot be misused by a thief because the subscriber identification module cannot be removed without proper entry of an identification sequence. The user can easily track the device if lost or misplaced, and theft of the device can be avoided while ensuring that the data in the device is secure. Other advantages will be obvious to those of ordinary skill in the art having the benefit of this disclosure.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A communication device, comprising:
   a communication circuit;
   one or more processors operable with the communication circuit;
   one or more memory devices, operable with the one or more processors;
   a user interface, operable with the one or more processors;
   a receiver to receive a subscriber identification module to enable at least some communication by the communication circuit;
   a locking mechanism, operable with the receiver and responsive to the one or more processors, to selectively physically retain the subscriber identification module within the receiver;
   the one or more processors to:
      detect insertion of the subscriber identification module into the receiver;
      request definition of an identification sequence at the user interface;
      receive the identification sequence from the user interface;
      cause the locking mechanism to physically retain the subscriber identification module within the receiver;
      receive a request for ejection of the subscriber identification module;
      request the identification sequence; and
      where another identification sequence is received that does not match the identification sequence or no identification sequence is received, cause the locking mechanism to preclude removal of the subscriber identification module from the receiver.

2. The communication device of claim 1, the identification sequence comprising a personal identification number.

3. The communication device of claim 1, the subscriber identification module comprising a subscriber identification module card.

4. The communication device of claim 3, wherein the one or more processors request the identification sequence at the user interface.

5. The communication device of claim 1, the one or more processors to disable user interaction with the communication circuit when the subscriber identification module is removed from the receiver prior to receiving the identification sequence in response to the request.

6. The communication device of claim 5, the one or more processors to cause the communication circuit to deliver a tracking beacon to a network when the subscriber identification module is removed from the receiver prior to receiving the identification sequence in response to the request.

7. The communication device of claim 1, the one or more processors further to:

receive a second request for ejection of the subscriber identification module from the receiver;

request, at the user interface, the identification sequence; and where the identification sequence is received, cause the locking mechanism to physically release the subscriber identification module for removal from the receiver.

8. The communication device of claim 7, the one or more processors further to, upon removal of the subscriber identification module from the receiver:

detect insertion of another subscriber identification module at the receiver;

request definition of another identification sequence at the user interface;

receive the another identification sequence from the user interface; and cause the locking mechanism to physically retain the subscriber identification module within the receiver.

9. The communication device of claim 1, the one or more processors to preclude the at least some communication by the communication circuit until the identification sequence is received.

10. The communication device of claim 1, the one or more processors further to initiate a timer and, where the identification sequence is not received prior to expiration of the timer, preclude the at least some communication by the communication circuit.

11. The communication device of claim 1, the one or more processors to:

receive a second request from the user interface, the second request to one of power OFF the communication device or disable communication by the communication circuit;

request, at the user interface, the identification sequence; and where the identification sequence is not received, prevent powering OFF the communication device or disabling the communication circuit.

12. The communication device of claim 1, the one or more processors to:

receive a second request and from the user interface, the second request to one of power ON the communication device or enable communication by the communication circuit;

request, at the user interface, the identification sequence; and where the identification sequence is not received, prevent powering ON the communication device or enabling the communication circuit.

13. The communication device of claim 1, the locking mechanism comprising a lockable motor to selectively eject the subscriber identification module from the receiver.

14. The communication device of claim 1, the locking mechanism comprising a lockable door to selectively close the receiver.

15. The communication device of claim 1, the locking mechanism comprising a lockable gating device to selectively prevent translation of the subscriber identification module out of the receiver.

16. A method, in a communication device, the method comprising:

detecting, with one or more processors, attachment of a subscriber identity module into a receiver of the communication device;

requesting, at a user interface, entry of an identification sequence;

upon receiving the identification sequence, causing a locking mechanism to physically retain the subscriber identity module within the receiver;

receiving a request to remove the subscriber identification module;

requesting the identification sequence; and where another identification sequence is received that does not match the identification sequence or no identification sequence is received, cause the locking mechanism to preclude removal of the subscriber identification module from the receiver.

17. The method of claim 16, wherein requesting the identification sequence is through the user interface.

18. The method of claim 17, further comprising:

detecting forced removal of the subscriber identity module without entry of the identification sequence; and disabling user interaction with one or more of the communication device or a communication circuit of the communication device.

19. The method of claim 18, further comprising sending a tracking beacon to a network by the communication circuit.

20. The method of claim 16, further comprising:

receiving a second request and from the user interface, the second request to one of power OFF the communication device or disable communication by a communication circuit;

requesting, at the user interface, the identification sequence; and where the identification sequence is not received in response to the requesting, preventing powering OFF the communication device or disabling the communication circuit.

* * * * *